(12) United States Patent
Lindsey et al.

(10) Patent No.: US 9,637,006 B2
(45) Date of Patent: May 2, 2017

(54) POWER CONVERTER FOR ELECTRIC HYBRID EARTHMOVING MACHINE

(71) Applicant: CATERPILLAR INC., Peoria, IL (US)

(72) Inventors: Robert W. Lindsey, Washington, IL (US); Donald John Gilmore, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 456 days.

(21) Appl. No.: 14/447,824

(22) Filed: Jul. 31, 2014

(65) Prior Publication Data

US 2016/0031328 A1    Feb. 4, 2016

(51) Int. Cl.

| | |
|---|---|
| *B60L 1/00* | (2006.01) |
| *B60L 3/00* | (2006.01) |
| *H02G 3/00* | (2006.01) |
| *B60L 11/08* | (2006.01) |
| *B60L 11/12* | (2006.01) |
| *B60L 11/18* | (2006.01) |
| *B60L 15/02* | (2006.01) |
| *B60W 20/00* | (2016.01) |

(52) U.S. Cl.
CPC ............... *B60L 11/08* (2013.01); *B60L 1/00* (2013.01); *B60L 11/12* (2013.01); *B60L 11/1811* (2013.01); *B60L 15/025* (2013.01); *B60W 20/00* (2013.01); *B60L 2200/40* (2013.01); *B60L 2210/00* (2013.01); *B60L 2240/527* (2013.01); *Y02T 10/643* (2013.01); *Y02T 10/7005* (2013.01); *Y02T 10/7072* (2013.01); *Y02T 10/7077* (2013.01); *Y02T 90/127* (2013.01); *Y02T 90/14* (2013.01)

(58) Field of Classification Search
CPC .................................. B60L 11/08; B60L 1/00
USPC ......................................................... 307/10.1
See application file for complete search history.

(56) References Cited

U.S. PATENT DOCUMENTS

| | | | |
|---|---|---|---|
| 6,864,663 B2 | 3/2005 | Komiyama et al. | |
| 7,911,079 B2 | 3/2011 | Hoff et al. | |
| 8,098,039 B2 | 1/2012 | Endo et al. | |
| 8,423,217 B2 | 4/2013 | Kojima et al. | |
| 8,479,848 B2 | 7/2013 | Yanagisawa | |
| 9,061,595 B2 * | 6/2015 | King ....................... B60L 1/003 |

(Continued)

FOREIGN PATENT DOCUMENTS

| | | |
|---|---|---|
| JP | 2011-190623 | 9/2011 |
| WO | WO 2013/122101 | 8/2013 |

*Primary Examiner* — Carlos Amaya
(74) *Attorney, Agent, or Firm* — Finnegan, Henderson, Farabow, Garrett & Dunner, LLP

(57) ABSTRACT

An electrical system architecture for a mobile, electric hybrid machine includes a first bus configured to receive electric power at a first, selectively adjustable voltage from an electrical power source. A second bus is configured to receive electric power at a second voltage that is lower than the first voltage. A controller is configured to determine a desired magnitude of the second voltage for the second bus, produce a signal indicative of a magnitude of the first, selectively adjustable voltage that is a multiple of the desired magnitude of the second voltage, and adjust the magnitude of the first voltage in the first bus to the multiple of the desired magnitude of the second voltage. A fixed-ratio power converter is configured to convert the power at the first voltage in the first bus to the power at the second voltage in the second bus.

20 Claims, 4 Drawing Sheets

(56) References Cited

U.S. PATENT DOCUMENTS

2011/0248563 A1 10/2011 Komma et al.
2013/0038271 A1 2/2013 Park

* cited by examiner

POWER CONVERTER FOR ELECTRIC HYBRID EARTHMOVING MACHINE

TECHNICAL FIELD

The present disclosure relates generally to a power converter and, more particularly, to a power converter for an electric hybrid earthmoving machine.

BACKGROUND

Internal combustion engines such as gasoline engines, diesel engines, and gaseous fuel-powered engines exhaust a complex mixture of air pollutants. In an effort to reduce the potential negative effects of these pollutants on the environment, exhaust emission standards for these engine systems have become more stringent. In fact, many industrialized countries impose environmental regulations that limit the amount of pollutants emitted to the atmosphere from an engine, depending on the type, size, and/or class of engine.

In an effort to reduce gaseous emissions, an emphasis has been placed on using electrical power to operate various components associated with a vehicle. Hybrid vehicles have been developed, for example, that rely on a combination of electrical energy and energy produced by a power source (e.g. an internal combustion engine or a fuel cell) to power certain electrical components such as, for example, traction motors for maneuvering the hybrid vehicle. Another example of an electrical accessory includes a hydraulic motor for use with heavy duty equipment such as, for example, an implement. Further, hybrid vehicles typically include one or more power storage devices (e.g. batteries) to receive and store excess electrical power from the power source and/or electrical power from regenerative dynamic braking of traction motors.

With the inclusion of power storage devices as alternate sources of electrical power, new electrical system architectures are being developed to make use of the power storage devices to increase the convenience, fuel economy, and safety of hybrid vehicles. For example, power storage devices may be configured to power the traction motors and/or electrical accessories for a limited period of time without requiring use of the power source. Thus, these architectures may reduce or eliminate fuel costs and emissions associated with the use of the power source during the limited period of time. Further, because start-up of a power source can take a relatively long period of time (e.g. five minutes for some heavy-duty hybrid vehicles), these architectures increase vehicle productivity by powering systems of the vehicle during the start-up period, thereby reducing equipment downtime during start-up.

One example of a system that provides power to accessories in a hybrid vehicle without requiring start-up of a main power unit is disclosed in U.S. Patent Application Publication 2007/0103002 ("the '002 publication") by Chiao et al. Specifically, the '002 publication discloses a heavy-duty hybrid vehicle power system including a main power unit, a power source (e.g. batteries, ultracapacitor packs, and/or flywheels), an electric traction motor, an electric accessory motor, and a DC-DC converter to step high voltage DC power down to a level required by low voltage accessories. The main power unit provides more than 640 volts of power to a DC power bus and is configured to provide power to the power source, the electric traction motor (via a first inverter), and the electric accessory motor (via a second inverter). The power source stores power from the main power unit as well as power generated from dynamic electromagnetic braking regeneration. The first inverter converts DC power from the DC power bus to AC power, which drives the electric traction motor to propel the heavy-duty hybrid vehicle. Similarly, the second inverter converts DC power from the DC power bus to AC power, which drives the electric accessory motor. The electric accessory motor powers a belt drive assembly, which drives one or more vehicle accessories. When the main power unit is shut down, the power source supplies DC power to the first inverter and the second inverter, thereby providing power to the electric traction motor and the electric accessory motor.

While the system of the '002 publication may provide power to an electric traction motor and an electric accessory motor without operating a main power unit, it is inflexible. In particular, conversion of high voltage power, e.g., 640 volts of DC power supplied through a traction bus to a traction motor, to low voltage power, e.g., 24 volts of DC power supplied through a low voltage bus to accessories such as lights, may require multiple power conversion stages and devices. This may increase complexity and expense of the electrical system architecture. Power conversion in these types of existing devices generally requires a multi-staged device with an internal pulse width modulation (PWM) controller that can precisely control the level of voltage in the low voltage bus to meet requirements of the various low voltage accessories.

The disclosed electrical system architecture is directed to overcoming one or more of the problems set forth above.

SUMMARY OF THE INVENTION

One aspect of the present disclosure is directed to an electrical system architecture for a machine. The electrical system architecture includes a first bus configured to receive electric power at a first, selectively adjustable voltage from an electric power source. The system architecture also includes a second bus configured to receive electric power at a second voltage that is lower than the first voltage. A controller is configured to determine a desired magnitude of the second voltage for the second bus, produce a signal indicative of a magnitude of the first, selectively adjustable voltage that is a multiple of the desired magnitude of the second voltage, and adjust the magnitude of the first voltage in the first bus to the multiple of the desired magnitude of the second voltage. The system architecture also includes a fixed-ratio power converter configured to convert the electric power at the first voltage in the first bus to the electric power at the second voltage in the second bus.

Another aspect of the present disclosure is directed to a method. The method includes generating electric power of a first, selectively adjustable voltage, supplying the generated electric power to a high voltage bus configured to provide high voltage electric power to a traction motor on a mobile vehicle, determining a desired magnitude of a second voltage lower than the first voltage suitable for powering one or more low voltage accessories connected to a low voltage bus on the mobile vehicle, adjusting the first voltage to a magnitude that is a multiple of the desired magnitude of the second voltage, and converting the high voltage electric power from the high voltage bus to the second voltage of a desired magnitude in the low voltage bus.

Yet another aspect of the present disclosure is directed to a mobile, electric hybrid machine. The mobile, electric hybrid machine includes a source of AC electric power, a rectifier configured to convert AC electric power to DC electric power, a high voltage traction bus configured for transmitting high voltage DC electric power to at least one traction motor, a low voltage bus configured for transmitting low voltage DC electric power to at least one accessory on the mobile, electric hybrid machine, and a controller. The controller is configured to determine a desired magnitude of the low voltage DC electric power in the low voltage bus, produce a signal indicative of a magnitude of the high voltage DC electric power that is a multiple of the desired magnitude of the low voltage DC electric power, and adjust the magnitude of the high voltage DC electric power in the high voltage traction bus to the multiple of the desired magnitude of the low voltage DC electric power. The mobile, electric hybrid machine also includes a fixed-ratio power converter configured to convert high voltage DC electric power from the high voltage traction bus to the low voltage DC electric power in the low voltage bus.

DETAILED DESCRIPTION

Figure 1:
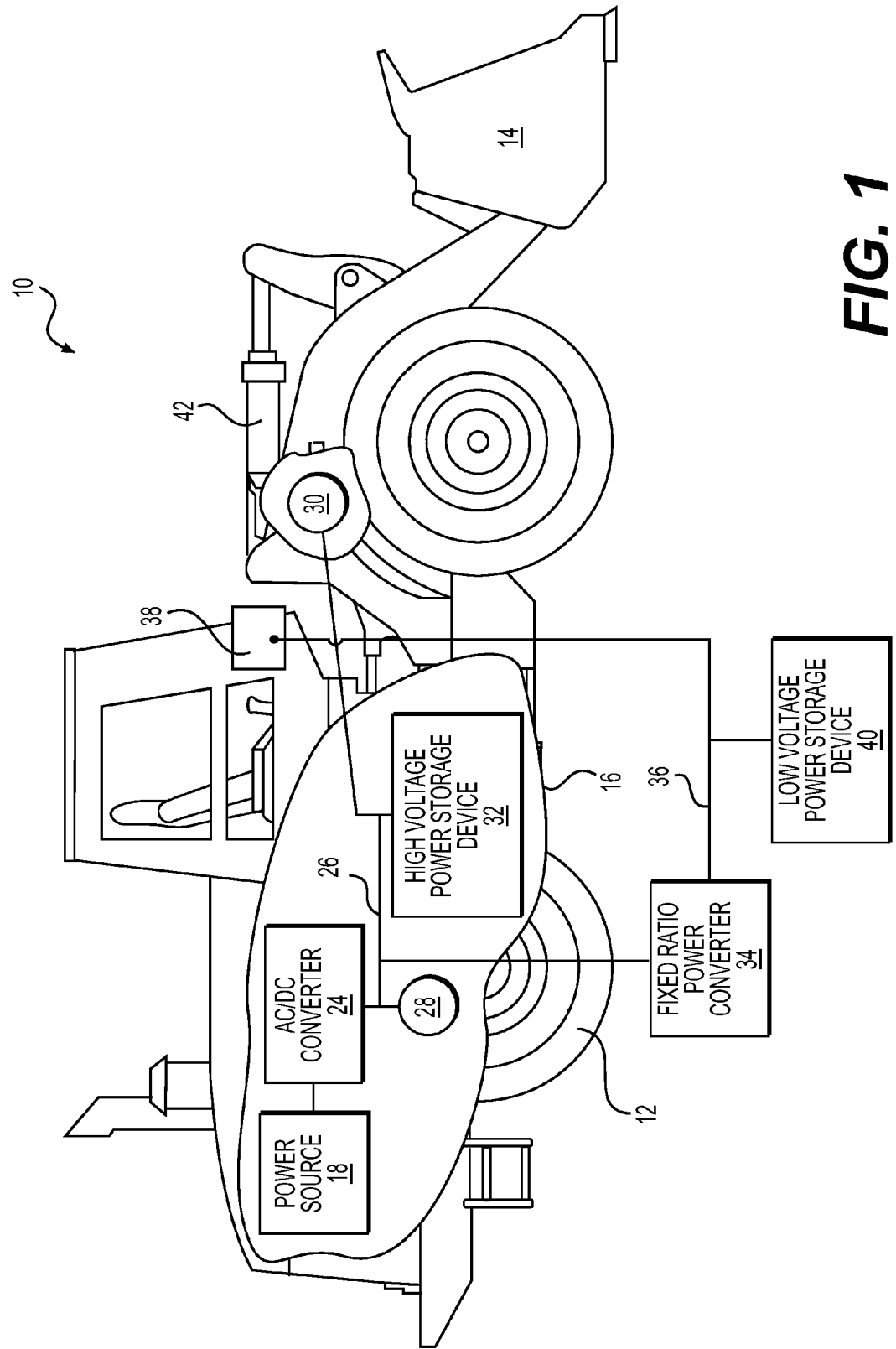
FIG. 1 is a diagrammatic and schematic illustration of an exemplary disclosed machine.

FIG. 1 illustrates an exemplary mobile, electric hybrid machine 10. Although the mobile, electric hybrid machine 10 is illustrated as a wheel loader, the mobile, electric hybrid machine 10 may embody any mobile, electric hybrid machine. For example, the mobile, electric hybrid machine 10 may be an earth moving machine such as a dozer, a backhoe, an excavator, a motor grader, or any other earth moving machine. The mobile, electric hybrid machine 10 may alternatively embody any other type of mobile hybrid machine 10 such as, for example, a hybrid automobile. The mobile, electric hybrid machine 10 may include a traction device 12, an implement 14, and an electrical system architecture 16 to provide power to the traction device 12, the implement 14, and/or other components of the mobile, electric hybrid machine 10.

The traction device 12 may embody one or more wheels located on each side of the hybrid machine 10. The traction device 12 may additionally or alternatively embody one or more tracks, belts, and/or any other device for maneuvering the hybrid machine 10. The traction device 12 may be driven mechanically, hydraulically, or in any other manner by one or more components of the electrical system architecture 16. For example, the traction device 12 may be driven by one or more electric traction motors associated with the electrical system architecture 16 through a drivetrain that includes, for example, a clutch, a differential, and/or a drive geartrain.

The implement 14 may include any vehicle implement. That is, although the implement 14 is illustrated as a loading shovel, it should be appreciated that the implement 14 may alternatively embody any other type of machine implement such as, for example, a ripper or a plow. In still further alternative implementations, hydraulic brakes or other accessories may be driven mechanically, hydraulically, or in any other manner by one or more components of the electrical system architecture 16. The implement 14 may be driven by one or more electric motors associated with the electrical system architecture 16 through a hydraulic actuator 42 including, for example, a pump to force pressurized fluid into and/or out of the hydraulic actuator 42. In various alternative implementations, the hybrid machine 10 may include a plurality of accessories.

The electrical system architecture 16 may provide electrical power to one or more components of the hybrid machine 10. For example, as shown in FIG. 1, the electrical system architecture 16 may include a power source 18, an AC/DC power converter 24, a fixed-ratio power converter 34, a high voltage bus 26, a traction motor 28, a high voltage power storage device 32, a high voltage implement motor 30, a low voltage bus 36, a low voltage power storage device 40, and a low voltage accessory load 38.

The power source 18 may provide high voltage alternating current ("AC") or high voltage direct current ("DC") power to the electrical system architecture 16, and may include any suitable electrical power source. For example, the power source 18 may embody a fuel cell or a generator set (e.g. an internal combustion engine mechanically coupled with a generator). The power source 18 may be configured to provide AC output of a selectively adjustable voltage level or range. For example, the power source 18 may provide a high voltage output suitable for providing power to traction motors connected to the high voltage bus 26. The high voltage AC power output by the power source 18 may be converted by the AC/DC power converter 24 to high voltage DC power with a voltage in a range, for example, between about 600 VDC and 1000 VDC (or any other suitable voltage level or range). The AC/DC power converter 24 is an electronic converter that may be connected to the high voltage bus 26, which supplies the high voltage DC power to the traction motors 28 that propel the hybrid machine 10. The high voltage DC power in the high voltage bus 26 may be further converted through another converter (see DC/AC power converter 228 in FIG. 2 and DC/AC power converter 328 in FIG. 3) back to AC power if desired for operating AC traction motors. The high voltage DC power in the high voltage bus 26 may be converted by a fixed-ratio power converter 34 to a low voltage DC power suitable for powering low voltage accessories such as lights. As shown in FIG. 1, low voltage DC power may be provided from the fixed-ratio power converter 34 to the low voltage bus 36, and from the low voltage bus 36 to one or more components or subsystems of the electrical system architecture 16. The power source 18 may alternatively generate DC power, and the DC power may be converted to the low voltage DC power by the fixed-ratio power converter 34.

The low voltage bus 36 may comprise an array of one or more electrical communication lines operable to carry a low voltage DC power signal. As one non-limiting example, the low voltage bus 36 may carry a low voltage power signal of approximately 24-28 Volts. The communication lines of the low voltage bus 36 may carry power signals of various voltages and/or currents and may include, among other signals, a ground signal. The low voltage bus 36 may be configured to deliver DC power to and/or from the low voltage accessory load 38, the fixed-ratio power converter 34, and the low voltage power storage device 40.

The low voltage accessory load 38 may include any number of auxiliary devices and/or systems of the hybrid machine 10 that may be powered by the low voltage DC power signal from the low voltage bus 36. For example, the low voltage accessory load 38 may include a fan motor, a compressor motor, one or more coolant pumps, headlights, dash lighting, or other accessories that may be provided in an operator cab.

The AC/DC power converter 24 may be a rectifier operable to convert AC power produced by the power source 18 to high voltage DC power that is supplied to the high voltage bus 26. More specifically, the power source 18 may comprise an AC generator driven by an internal combustion engine to produce AC electric power. The AC/DC power converter 24 may be configured to receive high voltage AC power from the power source 18, convert the high voltage AC power to high voltage DC power, and deliver the high voltage DC power to the high voltage bus 26.

As such, the AC/DC power converter 24 may embody any power electronics capable of converting high voltage AC power to high voltage DC power. For example, the AC/DC power converter 24 may include any number of thyristors, insulated gate bipolar transistors (IGBTs), metal-oxide-semiconductor field-effect transistors (MOSFETs), bipolar junction transistors (BJTs), operational amplifiers (op-amps), resistors, capacitors, inductors, diodes, etc., configured to operate according to the present disclosure. Many such circuits are known in the art, including, but not limited to, switched-mode converters, and switched capacitor converters.

The high voltage bus 26 may comprise an array of one or more electrical communication lines operable to carry a high voltage DC power signal. The communication lines of the high voltage bus 26 may carry power signals of various selectively adjustable voltages and/or currents and may include, among other signals, a ground signal. The high voltage bus 26 may be configured to deliver DC power to and/or from the AC/DC power converter 24, the traction motor 28, the high voltage implement motor 30, and the high voltage power storage device 32. The high voltage bus 26 may additionally be configured to deliver DC power to and/or from any number of other components such as, for example, a resistor grid configured to dissipate excess power from the high voltage bus 26 as heat.

The traction motor 28 may be an AC motor or a DC motor. As a DC motor, the traction motor 28 may be operable to receive high voltage DC power directly from the high voltage bus 26 and produce a mechanical power output. For example, the traction motor 28 may be electrically coupled to the high voltage bus 26 to receive high voltage DC power, convert the high voltage DC power to a mechanical power output (e.g. an output torque), and deliver the mechanical power to the traction device 12 to propel the hybrid machine 10. Although not shown, the traction motor 28 may be coupled with the high voltage bus 26 via any number of other components such as, for example, a contactor, switch, circuit breaker, relay, or any other suitable device. It should be appreciated that the traction motor 28 may be configured to drive the traction device 12 in any suitable manner, such as, for example, through a drivetrain, torque converter, etc. The speed and/or torque of the mechanical power output of the traction motor 28 may be at least partially dependent on the voltage and/or current of the high voltage DC power from the high voltage bus 26. As such, the traction motor 28 may additionally include power electronics and/or a control system to control the voltage and/or current delivered to drive the traction motor 28. For example, the traction motor 28 may include any number of controllers, thyristors, IGBTs, MOSFETs, BJTs, op-amps, resistors, capacitors, inductors, diodes, etc., configured to operate according to the present disclosure. That is, the traction motor 28 may embody any known DC motor capable of operating in accordance with the present disclosure, such as, for example, a switched reluctance motor. In alternative embodiments, the traction motor 28 may be an AC motor, and the high voltage DC electric power in the high voltage bus 26 may be converted to AC power suitable for use by the traction motor 28 using a DC/AC power converter (such as an electronic inverter), e.g., the DC/AC power converters 228 of FIGS. 2 and 328 of FIG. 3.

The traction motor 28 may also be operable to receive mechanical power for generating high voltage DC power in a dynamic braking mode. For example, the traction motor 28 may embody a DC motor/generator configured to receive an input torque from the traction device 12 and deliver high voltage DC power to the high voltage bus 26. The voltage and/or current delivered to drive the traction motor 28 may additionally or alternatively be controlled by power electronics and/or control systems included in other components of the electrical system architecture 16, such as, for example, the AC/DC power converter 24 and/or the high voltage power storage device 32. It should be appreciated that the traction motor 28 may alternatively embody a plurality of traction motors 28 and that the power output of the traction motor 28 may alternatively embody any other type of power output known in the art, such as, for example, hydraulic or pneumatic power.

The high voltage implement motor 30 may be configured to drive an implement (such as, for example, the bucket shown as the implement 14 of FIG. 1), and may be powered by high voltage DC power. For example, the implement motor 30 may be electrically coupled with the high voltage bus 26 to receive high voltage DC power therefrom. Although not shown, the implement motor 30 may be coupled with the high voltage bus 26 via any number of other components such as, for example, a contactor, switch, circuit breaker, relay, or any other suitable device. The implement motor 30 may be operatively coupled to the implement 14 to provide a mechanical power output for driving the implement 14. For example, the implement motor 30 may be mechanically, hydraulically, and/or pneumatically coupled to the implement 14 and configured to operate the implement 14 for performing a task associated with the hybrid machine 10. In an exemplary embodiment of the present disclosure, the implement motor 30 may be mechanically coupled with the hydraulic actuator 42, which may be operated to control the movement of the implement 14. More specifically, the implement motor 30 may be powered by the high voltage DC power from the high voltage bus 26 to produce a mechanical power output such as, for example, a rotation of a shaft (not shown). The shaft may be mechanically coupled with the pump of the hydraulic actuator 42 such that a rotation of the shaft may drive the pump to force pressurized fluid into and/or out of the hydraulic actuator 42, thus driving the movement of the implement 14.

The high voltage implement motor 30 may be configured to receive high voltage DC power associated with the high voltage bus 26 to produce a torque output. The speed and/or torque of the mechanical power output of the implement motor 30 may be dependent on the voltage and/or current of the high voltage DC power from the high voltage bus 26. As such, the implement motor 30 may additionally include power electronics and/or a control system to control the voltage and/or current delivered to drive the implement motor 30. For example, the implement motor 30 may include any number of controllers, thyristors, IGBTs, MOSFETs, BJTs, op-amps, resistors, capacitors, inductors, diodes, etc., configured to operate according to the present disclosure. That is, the implement motor 30 may embody any known DC or AC motor capable of operating in accordance with the present disclosure, such as, for example, a switched reluctance motor. The implement motor 30 may additionally be operable to receive mechanical power and use it to generate high voltage DC power in a dynamic regeneration mode. For example, the implement motor 30 may embody a DC motor/generator. The voltage and/or current delivered to drive the implement motor 30 may additionally or alternatively be controlled by power electronics and/or control systems included in other components of the electrical system architecture 16, such as, for example, the AC/DC power converter 24 and/or the high voltage power storage device 32. The implement motor 30 may alternatively embody a plurality of implement motors 30 (e.g. each associated with a respective implement 14 of the hybrid machine 10) and/or any other type of electrically-powered accessory actuator, such as, for example, a hydraulic pump.

The high voltage power storage device 32 may be any type of power storage device such as, for example, a battery, an ultra-capacitor, or a flywheel. In an exemplary embodiment of the present disclosure, the high voltage power storage device 32 may store high voltage DC power from the high voltage bus 26. For example, the high voltage power storage device 32 may store excess power generated by the power source 18 and/or generated by regenerative dynamic braking of the traction motor 28.

Alternatively or additionally, the high voltage power storage device 32 may provide high voltage DC power to the high voltage bus 26. For example, the high voltage power storage device 32 may provide high voltage DC power to the traction motor 28 and/or the implement motor 30 when the power source 18 is deactivated, unavailable, or operating at a reduced power output capacity. Additionally or alternatively, the high voltage power storage device 32 may supply additional high voltage DC power that may be used by the traction motor 28 and/or the implement motor 30 during operation of the power source 18 to, for example, reduce some of the burden on the power source 18 during peak periods. In an exemplary embodiment of the present disclosure, the high voltage power storage device 32 may store high voltage DC power that falls within a range from approximately 600 VDC to 1000 VDC. Although not shown, the high voltage power storage device 32 may be coupled with the high voltage bus 26 via any number of other components such as, for example, a contactor, switch, circuit breaker, relay, or any other suitable device.

The fixed-ratio power converter 34 may include a set of power electronics operable to convert DC power at the selectively adjustable high voltage on the high voltage bus 26 to DC power at the desired low voltage to be supplied over the low voltage bus 36. More specifically, the fixed-ratio power converter 34 may be configured to receive high voltage DC power from the high voltage bus 26, convert the high voltage DC power by a fixed-ratio to a desired low voltage DC power, and deliver the low voltage DC power to the low voltage bus 36. As such, the fixed-ratio power converter 34 may embody any power electronics capable of converting high voltage DC power to a low voltage DC power, wherein the high voltage DC power has been adjusted to a magnitude that is a multiple of the desired low voltage DC power. For example, the fixed-ratio power converter 34 may include any number of thyristors, IGBTs, MOSFETs, BJTs, op-amps, resistors, capacitors, inductors, diodes, etc., configured to convert high voltage DC power to low voltage DC power.

The low voltage accessory load 38 may include any number of auxiliary devices and/or systems of the hybrid machine 10 that may be powered by the low voltage DC power signal from the low voltage bus 36. For example, the low voltage accessory load 38 may include lighting systems, heating systems, coolant systems, and/or control systems.

The low voltage power storage device 40 may be any type of known power storage device such as, for example, a battery, an ultra-capacitor, or a flywheel. In an exemplary embodiment of the present disclosure, the low voltage power storage device 40 may store low voltage DC power from the low voltage bus 36. For example, the low voltage power storage device 40 may store excess power generated by the power source 18 via the fixed-ratio power converter 34. Additionally or alternatively, the low voltage power storage device 40 may provide low voltage DC power to the low voltage bus 36. For example, the low voltage power storage device 40 may provide low voltage DC power to the low voltage accessory load 38 when the power source 18 is deactivated, unavailable, or operating at a reduced power output capacity. Additionally or alternatively, the low voltage power storage device 40 may provide additional low voltage DC power that may be used by the low voltage accessory load 38 during operation of the power source 18, for example, during peak operating periods. In an exemplary embodiment of the present disclosure, the low voltage power storage device 40 may store low voltage DC power at approximately 24-28 Volts. It should be appreciated that although not shown, the low voltage power storage device 40 may be coupled with the low voltage bus 36 via any number of other components such as, for example, a contactor, circuit breaker, switch, relay, etc.

Figure 2:
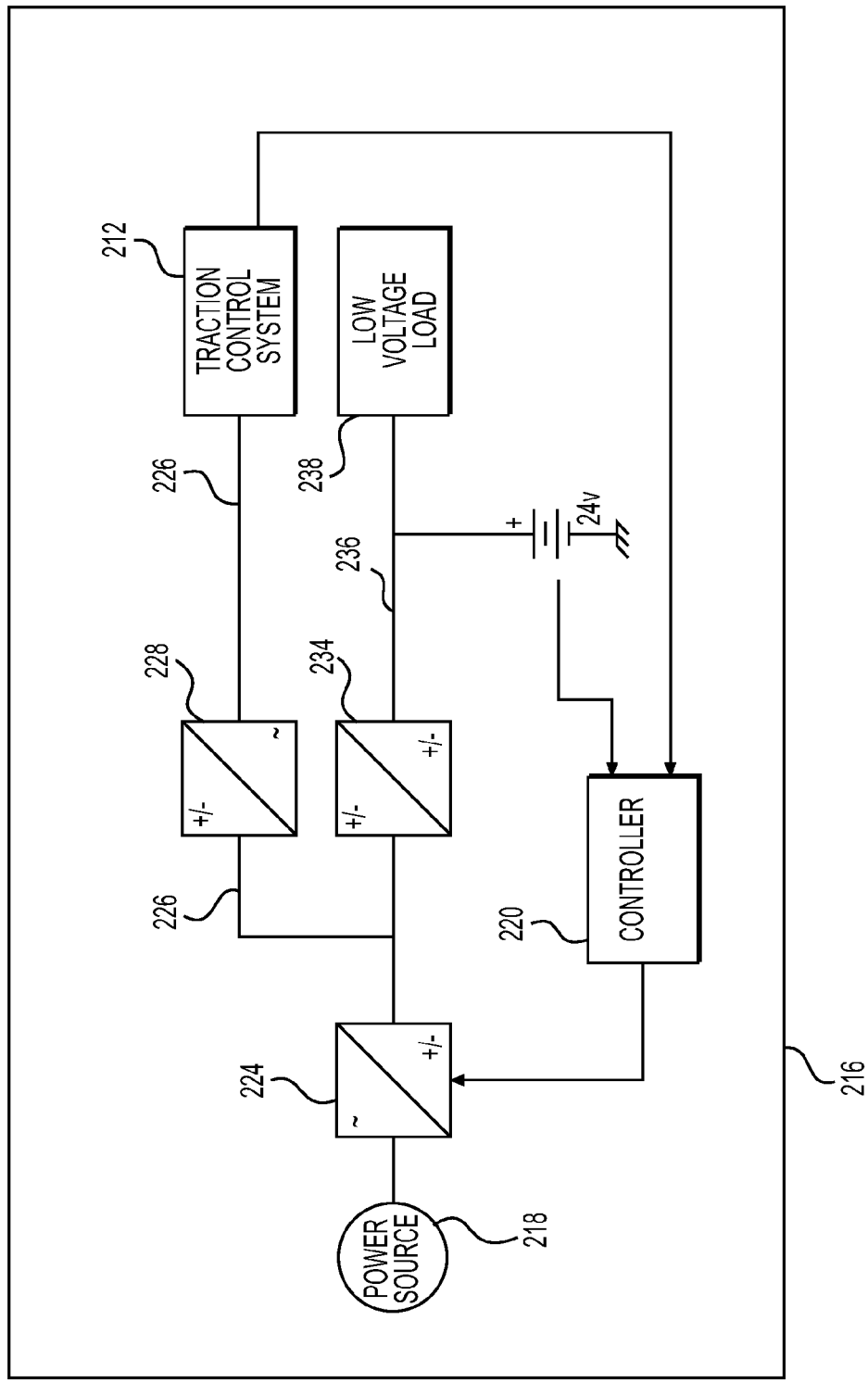
FIG. 2 is a schematic illustration of an electrical system architecture for use with the machine of FIG. 1.

FIG. 2 illustrates an implementation of the electrical system architecture 216 wherein a controller 220 is configured to receive a signal indicative of a desired magnitude of a low voltage provided over the low voltage bus 236 to a low voltage accessory load 238. The controller 220 may be configured to monitor the voltage on the low voltage bus 236, and then produce a signal indicative of a magnitude of a selectively adjustable higher voltage that is a multiple of the desired magnitude of the low voltage. The controller 220 may further be configured to adjust the magnitude of the selectively adjustable higher voltage to the magnitude that is a multiple of the desired magnitude of the low voltage through any of several different techniques. In the implementation shown in FIG. 2, the controller 220 may be configured to adjust the magnitude of the higher voltage provided over the high voltage bus 226 by controlling an AC/DC power converter 224, which receives AC electric power from a power source 218. The AC/DC power converter 224 may be configured to convert the high voltage AC electric power received from the power source 218 to high voltage DC electric power, as well as adjusting the magnitude of the high voltage DC power to a multiple of the desired magnitude of the low voltage in the low voltage bus 236. A fixed-ratio power converter 234 may be configured to receive this high voltage DC power from the high voltage bus 226 and convert the high voltage DC power directly to the desired low voltage power without the requirement of multiple stages of power conversion. The high voltage DC power in the high voltage bus 226 may be supplied to various high voltage loads such as the traction control system 212, while the low voltage DC power in the low voltage bus 236 may be supplied to one or more low voltage accessory loads 238.

Figure 3:
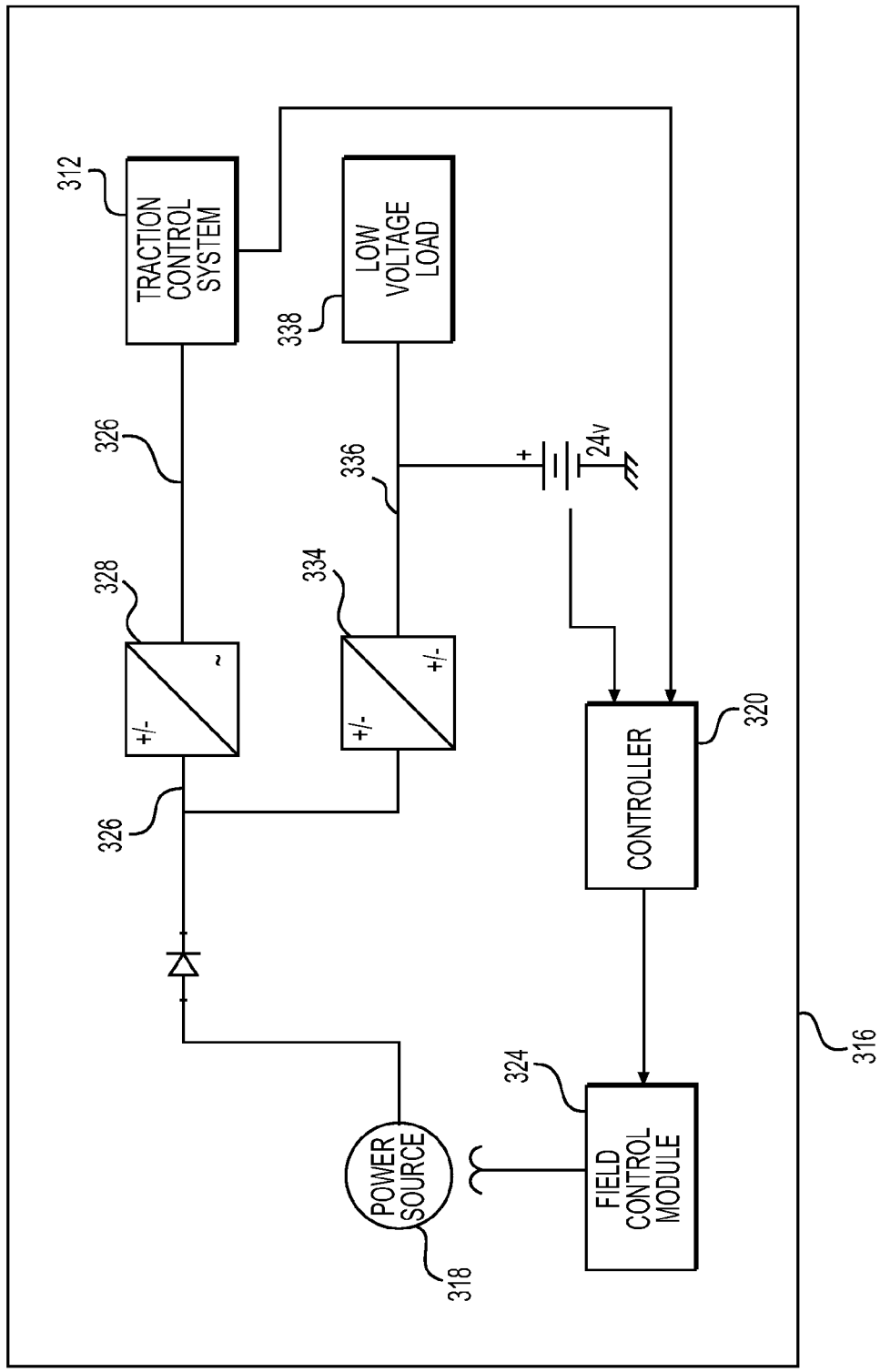
FIG. 3 is a schematic illustration of another electrical system architecture for use with the machine of FIG. 1.

FIG. 3 illustrates an alternative embodiment of the electrical system architecture 16. Similar to the electrical system architecture 216 of FIG. 2, the electrical system architecture 316 of FIG. 3 may include a power source 318, a high voltage bus 326, a DC/AC power converter 328, a fixed-ratio power converter 334, a low voltage bus 336, a traction control system 312, a low voltage accessory load 338, and a controller 320. The controller 320 may be configured to monitor the voltage on the low voltage bus 336, and then produce a signal indicative of a magnitude of a selectively adjustable higher voltage that is a multiple of the desired magnitude of the low voltage. The controller 320 may further be configured to adjust the magnitude of the selectively adjustable higher voltage in the high voltage bus 326 to the magnitude that is a multiple of the desired magnitude of the low voltage in the low voltage bus 336. In the implementation shown in FIG. 3, the controller 320 may adjust the magnitude of the high voltage in the high voltage bus 326 by controlling the strength of the rotor magnetic field in a generator of the power source 318. This can be achieved using a field control module 324. A fixed-ratio power converter 334 may be configured to receive this selectively adjustable high voltage DC power from the high voltage bus 326 and convert the high voltage DC power directly to the desired low voltage power without the requirement of multiple stages of power conversion. The high voltage DC power in the high voltage bus 336 may be supplied to various high voltage loads such as the traction control system 312, while the low voltage DC power in the low voltage bus 336 may be supplied to one or more low voltage accessory loads 338.

Figure 4:
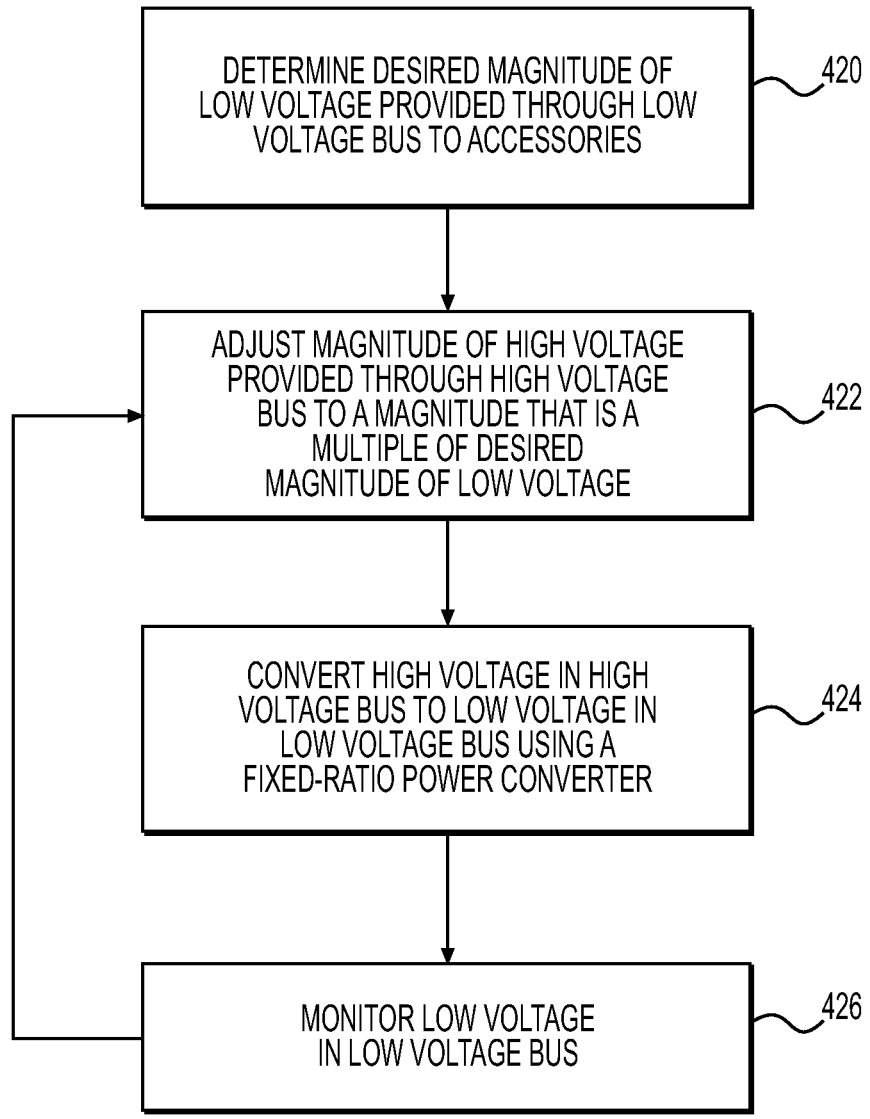
FIG. 4 is a flowchart illustrating a method that may be performed by the electrical system architecture of one or more of FIGS. 2 and 3.

FIG. 4 illustrates a control process implemented by the controller 220 or 320 within an electrical system architecture for a mobile vehicle. The illustrated control process allows for the use of a simple fixed-ratio power converter to convert a high voltage electric power to a desired low voltage electric power. FIG. 4 will be discussed in more detail below to further illustrate the disclosed concepts.

INDUSTRIAL APPLICABILITY

The system of the present disclosure may provide an electrical system architecture with a high voltage bus, a low voltage bus, and a fixed-ratio power converter configured to convert the high voltage electric power through a simple, single-stage conversion to the low voltage electric power. The high voltage bus may be configured for providing high voltage electric power to a load such as a traction control system and/or a high voltage implement motor. The low voltage bus may be configured for providing low voltage electric power suitable for powering various accessories such as lights. The electrical system architecture in accordance with various implementations of this disclosure achieves accurate control of the low voltage output to various low voltage devices connected to the low voltage bus by adjusting the magnitude of the high voltage carried by the high voltage bus. A controller may monitor the low voltage being output at any time and provide feedback based on the low voltage output to control the amount of high voltage electric power being produced by the power source or the amount of high voltage electric power being carried by the high voltage bus. The controller may provide a signal to adjust the high voltage electric power to a multiple of the desired low voltage output. The disclosed electrical system architecture may be applicable to any hybrid machine and, in particular, to any hybrid machine having at least one high voltage load, such as a traction device, and at least one low voltage accessory load that can be at least partially driven by electrical power. The operation of electrical system architecture 16 with regard to hybrid machine 10 will now be explained.

Referring to FIG. 1, the hybrid machine 10 may be propelled by movement of the traction device 12, and may perform one or more functions by way of movement of the implement 14. The traction device 12 and the implement 14 may both be powered to move by one or more components of the electrical system architecture 16. For example, a mechanical power output of the traction motor 28 may drive the movement of the traction device 12 while a mechanical power output of the implement motor 30 may drive the movement of the implement 14 via the hydraulic actuator 42. Each of the traction motor 28 and the implement motor 30 may be powered by electrical power (e.g., DC power) provided by one or more components of the electrical system architecture 16. Operation of the electrical system architecture 16 will now be described in further detail with regard to FIG. 4, and the alternative implementations of FIGS. 2 and 3.

The power source 18, 218, 318 may produce a high voltage AC power output, and deliver the high voltage AC power to the high voltage bus 26, 226, 326. The high voltage AC power may be converted by the AC/DC power converter 24 to high voltage DC power suitable for a high voltage load such as a traction control system and traction motors. The high voltage DC power may be carried by a high voltage bus, and may also be converted through a fixed-ratio power converter to a low voltage electric power suitable for various low voltage accessory loads such as lighting.

As shown in FIG. 4, the controller 220, 320 associated with the electrical system architecture 216, 316 may determine a desired magnitude of the low voltage provided through the low voltage bus 236, 336 to various accessories (Step 420). The controller 220, 320 may then adjust the magnitude of the high voltage provided through the high voltage bus 226, 326 to a magnitude that is a multiple of the desired magnitude of the low voltage (Step 422). Referring back to FIGS. 2 and 3, this adjustment of the magnitude of the high voltage may be achieved through different means. As shown in FIG. 2, adjustment of the magnitude of the high voltage may include using an AC/DC power converter 224 configured to receive high voltage AC electric power from the power source 218 and convert that AC power to DC power of the desired magnitude. Alternatively, as shown in FIG. 3, adjustment of the magnitude of the high voltage to a multiple of the desired low voltage may include adjusting the strength of the rotor magnetic field in the generator of power source 318 using a field control module 324.

After having adjusted the magnitude of the high voltage in the high voltage bus 226, 326 to a multiple of the desired magnitude of the low voltage, the high voltage from the high voltage bus 226, 326 may be converted to the desired low voltage in the low voltage bus 236, 336 using a fixed-ratio power converter 234, 334 (Step 424). The fixed-ratio power converter 234, 334 reduces the cost and complexity of the power converter since the required power conversion can be performed in a single stage. The above-described electrical architecture also allows for the accurate control of voltage in the low voltage bus 236, 336 by simply controlling the voltage in the high voltage bus 226, 326. The controller 220, 320 may also monitor the output voltage on the low voltage bus 236, 336 (Step 426) and then provide this as feedback for continually or periodically adjusting the magnitude of the high voltage provided through the high voltage bus 226, 326 to a magnitude that is a multiple of the magnitude of the low voltage.

It will be apparent to those skilled in the art that various modifications and variations can be made to the electrical system architecture of the present disclosure without departing from the scope of the disclosure. Other embodiments will be apparent to those skilled in the art from consideration of the specification and the practice of the electrical system architecture disclosed herein. It is intended that the specification and examples be considered as exemplary only, with a true scope of the disclosure being indicated by the following claims and their equivalents.

What is claimed is:

1. An electrical system architecture for a machine, comprising:
    a first bus configured to receive electric power at a first, selectively adjustable voltage from an electrical power source;
    a second bus configured to receive electric power at a second voltage that is lower than the first voltage;
    a controller configured to:
        determine a desired magnitude of the second voltage for the second bus;
        produce a signal indicative of a magnitude of the first, selectively adjustable voltage that is a multiple of the desired magnitude of the second voltage; and
        adjust the magnitude of the first voltage in the first bus to the multiple of the desired magnitude of the second voltage; and
    a fixed-ratio power converter configured to convert the power at the first voltage in the first bus to the power at the second voltage in the second bus.

2. The electrical system architecture of claim 1, wherein the power source is an engine coupled with a generator.

3. The electrical system architecture of claim 2, wherein the controller is configured to adjust the magnitude of the first voltage in the first bus by varying a strength of a rotor magnetic field in the generator.

4. The electrical system architecture of claim 2, further including an electronic converter configured to receive AC electric power from the generator and convert the AC electric power to DC electric power, and wherein the controller is configured to adjust the magnitude of the first voltage in the first bus by controlling the electronic converter.

5. The electrical system architecture of claim 1, wherein the first bus is configured to provide electric power to at least one of a traction motor and an implement motor.

6. The electrical system architecture of claim 1, wherein the second bus is configured to provide electric power to an accessory.

7. The electrical system architecture of claim 1, wherein:
    the first bus is configured to provide electric power to an AC traction motor; and
    the electrical system architecture further including:
        an AC/DC power converter, wherein the AC/DC power converter is configured to:
            receive AC power from a generator;
            convert the AC power to DC power at the first, selectively adjustable voltage; and
            provide the DC power to the first bus; and
        a DC/AC power converter, wherein the DC/AC power converter is configured to:
            convert the DC power in the first bus to AC electric power for use by the AC traction motor; and
            deliver the AC power to the AC traction motor.

8. The electrical system architecture of claim 1, wherein the first voltage is about 600-1000 VDC.

9. The electrical system architecture of claim 1, wherein the second voltage is about 24-28 Volts.

10. A method of operating a mobile, electric hybrid machine, comprising:
    generating electric power of a first, selectively adjustable voltage;
    supplying the generated electric power to a high voltage bus configured to provide high voltage electric power to a traction motor on the mobile, electric hybrid machine;
    determining a desired magnitude of a second voltage lower than the first voltage suitable for powering one or more low voltage accessories connected to a low voltage bus on the mobile, electric hybrid machine;
    adjusting the first voltage to a magnitude that is a multiple of the desired magnitude of the second voltage; and
    converting the high voltage electric power from the high voltage bus to the second voltage of a desired magnitude in the low voltage bus.

11. The method of claim 10, wherein generating electric power includes:
    driving an electric generator using an internal combustion engine.

12. The method of claim 11, wherein adjusting the magnitude of the first voltage in the high voltage bus includes varying a strength of a rotor magnetic field in the generator.

13. The method of claim 10, wherein:
    generating electric power of a first, selectively adjustable voltage comprises generating AC electric power and converting the AC electric power to DC electric power using an electronic rectifier; and
    adjusting the first voltage in the high voltage bus includes controlling the electronic rectifier.

14. The method of claim 10, further including supplying the electric power in the high voltage bus to an implement motor.

15. The method of claim 10, wherein determining the desired magnitude of the second voltage in the low voltage bus is performed on at least a periodic basis, and adjusting the first voltage to a magnitude that is a multiple of the desired magnitude of the second voltage is updated based upon the determined results for the second voltage.

16. A mobile, electric hybrid machine, comprising:
    a source of AC electric power;
    a rectifier configured to convert AC electric power to DC electric power;
    a high voltage bus configured for transmitting high voltage DC electric power to at least one traction motor;
    a low voltage bus configured for transmitting low voltage DC electric power to at least one accessory on the mobile, electric hybrid machine;
    a controller, wherein the controller is configured to:
        determine a desired magnitude of the low voltage DC electric power in the low voltage bus;
        produce a signal indicative of a magnitude of the high voltage DC electric power that is a multiple of the desired magnitude of the low voltage DC electric power; and
        adjust the magnitude of the high voltage DC electric power in the high voltage bus to the multiple of the desired magnitude of the low voltage DC electric power; and
    a fixed-ratio power converter configured to convert high voltage DC electric power from the high voltage bus to the low voltage DC electric power in the low voltage bus.

17. The mobile, electric hybrid machine of claim 16, wherein the source of AC electric power comprises an engine coupled with a generator.

18. The mobile, electric hybrid machine of claim 16, wherein the controller is configured to adjust the magnitude of the high voltage DC electric power in the high voltage bus by varying a strength of a rotor magnetic field in the generator.

19. The mobile, electric hybrid machine of claim 16, wherein the controller is configured to adjust the magnitude of the high voltage DC electric power in the high voltage bus by controlling the rectifier.

20. The mobile, electric hybrid machine of claim 16, wherein:
- the high voltage bus is configured to provide electric power to an AC traction motor; and
- the mobile, electric hybrid machine further includes a DC/AC power converter, wherein the DC/AC power converter is configured to:
  - receive high voltage DC electric power from the high voltage bus;
  - convert the high voltage DC electric power to AC electric power for use by the AC traction motor; and
  - deliver the AC power to the AC traction motor.

* * * * *